Nov. 26, 1957   R. G. STEPHANSKI   2,814,532
BRAKE SYSTEMS
Filed April 2, 1952   2 Sheets-Sheet 1
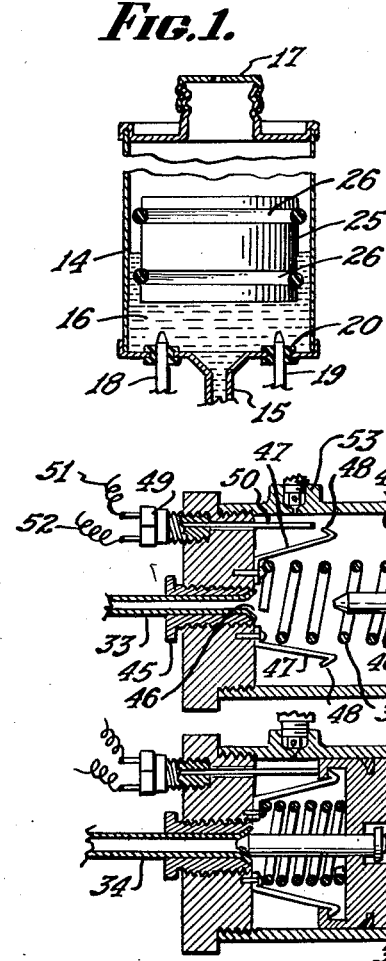
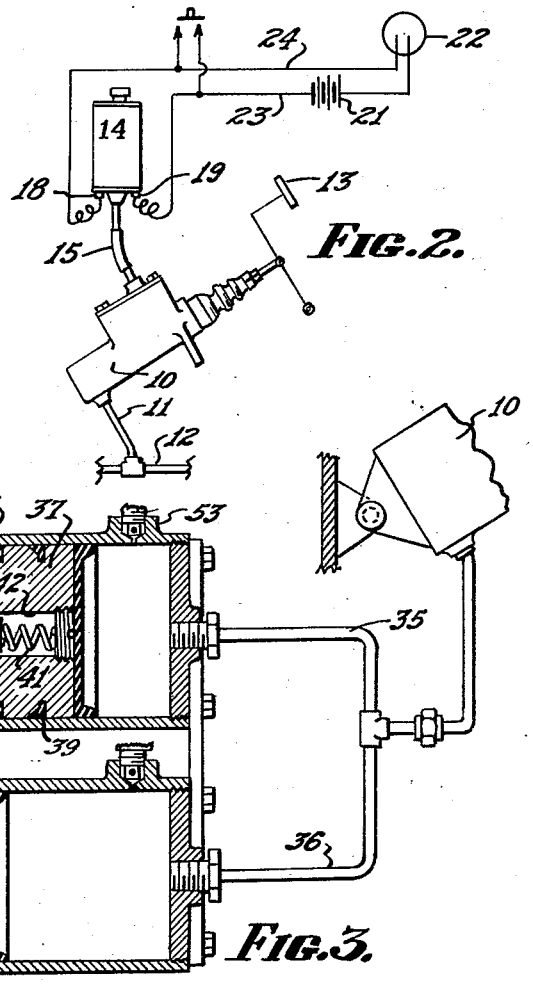
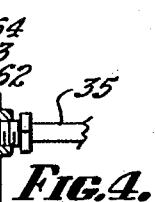
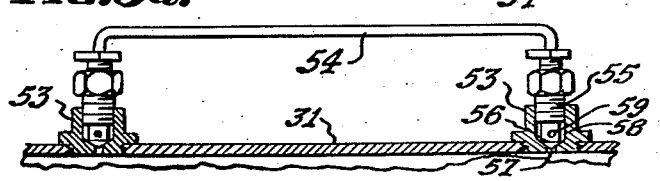
INVENTOR.
ROBERT G. STEPHANSKI,
BY Allen & Allen
ATTORNEYS.

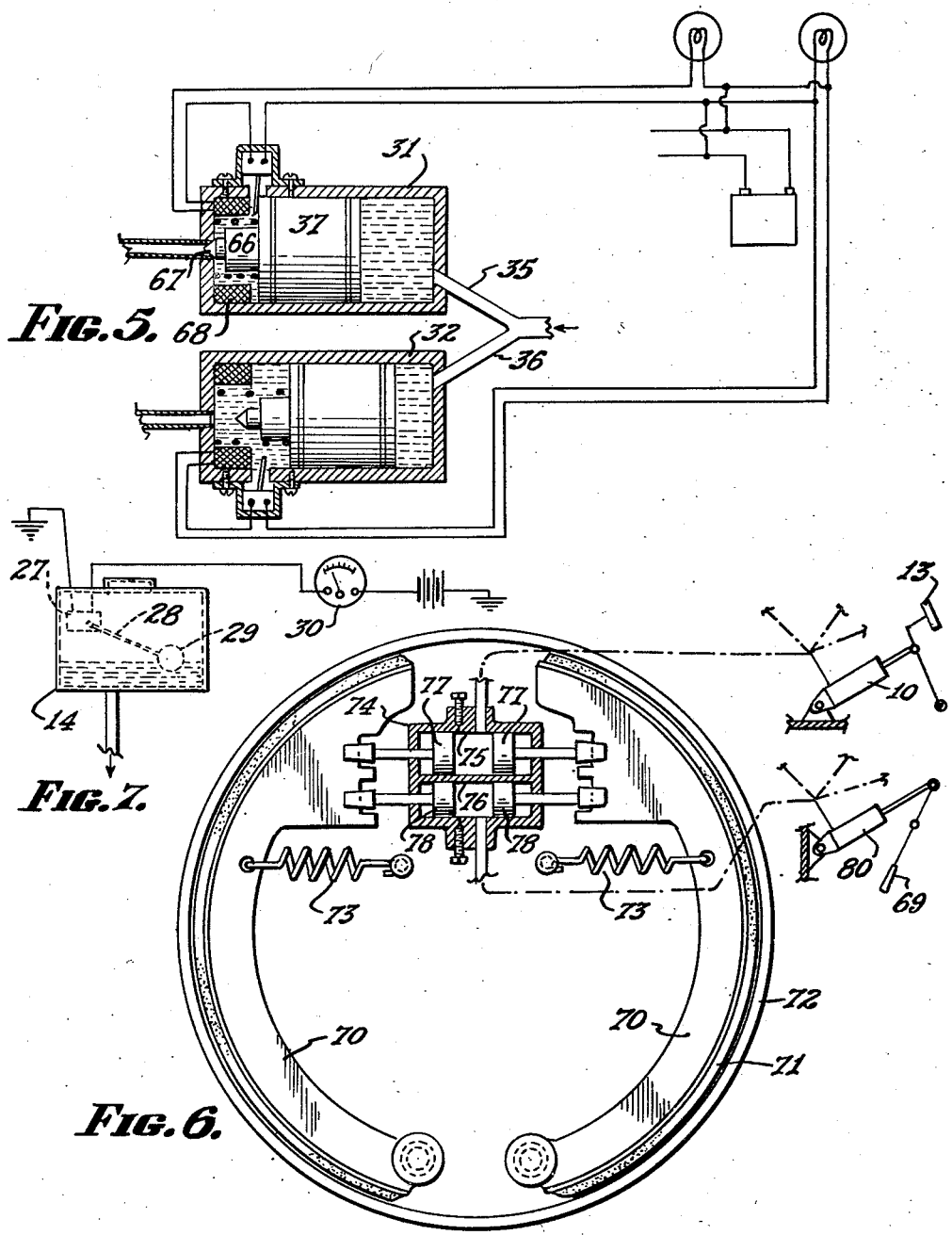

United States Patent Office 2,814,532
Patented Nov. 26, 1957

2,814,532

BRAKE SYSTEMS

Robert G. Stephanski, Frankfort, Ky.

Application April 2, 1952, Serial No. 280,085

1 Claim. (Cl. 303—84)

My invention relates to new and improved brake systems, and arrangements therein, particularly those used in connection with motor vehicles such as automobiles, trucks and buses.

The ever increasing number of deaths resulting from automobile accidents and the like in this country have in some fair measure been due to mechanical failures, a large number of which have occurred in the brake system. A primary object of my invention, therefore, is to provide means which greatly increases the safety factor in vehicle construction and operation.

It is an object of my invention to provide a brake system wherein should there be a failure in the line leading to one of the brakes the brake fluid for the entire system will not all be lost, but rather, at least half of the braking power will be maintained in spite of the one faulty brake.

Another important object of my invention is to provide visible means by which a driver is warned that a defect of some sort has come about in the brake system of the vehicle he is operating.

Another object of my invention is to provide a brake system in which the brakes may be effectively operated either from the normal foot brake or from the hand brake, the arrangement being such that a defect in one system will not affect operation of the other system.

Another object of my invention is to provide a novel cylinder construction especially designed for use in a brake system which employs a pair of auxiliary cylinders in connection with the regular master cylinder.

Yet another object of my invention is to provide a novel cylinder arrangement particularly adapted for use in connection with brake drums which are to be actuated by either one of two separate brake systems, one controlled by the hand brake and the other controlled by the foot brake.

These and many other objects and advantages of my invention will become apparent to one skilled in the art during the course of the following description and from reference to the acompanying drawings in which like numerals are employed to designate like parts throughout the same and in which:

Figure 1 is a fragmentary sectional view of a container adapted to be employed in connection with the master cylinder of a standard brake system, Figure 2 is more or less a diagrammatic view of the arrangement including the container of Figure 1 and the master cylinder as well as including the warning system employed in connection with the said container, Figure 3 is a sectional view taken through the pair of auxiliary cylinders employed with a master cylinder in the novel brake system herein disclosed, parts of the cylinders being broken away, Figure 3a is a fragmentary sectional view disclosing that portion of the auxiliary cylinders which was broken away from Figure 3, Figure 4 is a fragmentary sectional view of a modification of one of the auxiliary cylinders of Figure 3, Figure 5 is a partially diagrammatic view and a partial sectional view of a modification of the arrangement of Figure 3, Figure 6 is a partial sectional view and a partial diagrammatic view of a dual brake system and the novel piston-cylinder arrangement employed with the individual brake drums, and Figure 7 is a diagrammatic showing of a modification of the arrangement of Figure 2.

Referring first to Figures 1 and 2 I shall describe what I consider to be a very important part of the instant invention. In these figures I have disclosed a novel arrangement by means of which the driver is warned that a leak has developed in some part of the brake system, this warning coming at a time when there is still sufficient brake fluid in the system to insure safe operation for a limited time. In these figures the ordinary master cylinder normally employed in the more or less standard brake systems utilized today is indicated at 10. It will be understood that this cylinder feeds brake fluid through the lines 11 and 12 to the various individual brakes in the normal manner. Such brakes are actuated when the foot pedal 13 is depressed.

In connection with this master cylinder 10 I provide an auxiliary supply of brake fluid which is maintained in the container 14. There is a constantly open connection between the container 14 and the master cylinder 10. This is generally indicated at 15.

Normally when a leak occurs in any part of the brake system ahead of the master cylinder 10, actuation of the foot pedal 13 will simply cause the brake fluid to escape through the said leak with the result that eventually most of the fluid will escape and no braking action will be forthcoming. Usually a first indication that such a leak has occurred, insofar as the operator is concerned, comes at a time when he most needs good braking action, at the time he applies his brakes and finds that they are wholly inoperative. It is to the prevention of this type of thing that this particular embodiment of my invention is directed.

In my arrangement, should a leak develop in some part of the brake system in a manner similar to that just described, additional fluid will be automatically supplied to the systems from the container 14 via the connection 15 into the master cylinder 10. This will enable effective braking to be continued for a time even though brake fluid is lost each time the foot pedal 13 is operated. As a matter of fact, operation of a standard cylinder without my auxiliary container would ordinarily enable a car to continue for a time, the only difficulty being that the driver would not be warned that he was using up the small excess provided in the master cylinder itself. This I have overcome by employing a warning device in connection with the auxiliary container.

In Figure 1 the container 14 is generally indicated and it is to be understood that this container may be of any construction capable of maintaining an adequate supply of brake fluid 16. The top of the container will contain a cap 17 which may be easily removed when desired. The conduit 15 leading from the bottom of the container to the upper portion of the master cylinder 10 is also indicated.

In cooperation with this container 14 I have provided a pair of switch contacts 18 and 19 located in the bottom of the container. It is to be understood that each of these contacts wil have a bearing within suitable dielectric material such as indicated at 20. As seen in Figure 2, it will be observed that the contacts 18 and 19 are both in a circuit which includes a battery 21 and an indicating light or other signal 22. It will be understood that the signal 22 is placed on the dash board or other convenient spot within the vehicle in such position that it will be plainly visible to the operator when it is actuated by the conditions now to be described. The leads comprising the circuit are indicated at 23 and 24.

Located within the container 14 and floating in the fluid 16 is a float member 25. This member may be provided with a pair of grooves in which there is fit dielectric material so as to form a pair of bumpers or the like 26. These guards 26 serve to keep the float 25 out of electrical contact with the side wall of the container 14. The float 25 may be constructed of a material which will itself conduct electricity or a conducting strip or plate may be fastened to the bottom thereof in some suitable way. When the float sinks within the container to such a point that it comes to rest on the contacts 18 and 19, the circuit through the leads 23 and 24, the battery 21 and signal 22 will be completed. When the circuit is so completed the signal will be actuated and the driver warned that there is a leak in the brake system and that a certain amount of the auxiliary fluid has been used. The driver would know that he could continue operation of his brake system for a limited time, said continued operation being afforded by the fluid remaining in the container and by the normal extra fluid provided in the master cylinder itself.

If desired, it will be observed that the connecting posts 18 and 19 may be positioned within the container so that the float 25 will come into contact therewith at a time when there still remains considerable amount of fluid in the container itself. This is accomplished by moving the posts 18 and 19 upwardly as viewed in Figure 1.

In Figure 7 I have illustrated a modification of the float and signal arrangement. In this modification I have included a rheostat 27 which is actuated by a float 28 and a connecting plate 29. The rheostat is connected in a circuit which includes an indicator 30 which may be located on the cowl board. This arrangement informs the operator as to just how much brake fluid remains in the auxiliary container. At any time should the indicator move from its full position towards the empty mark, the driver will thereby be informed that a leak has occurred in the brake system and that the auxiliary fluid is being used. Not only will he know that a leak has occurred but he will also know approximately how much longer he can continue to drive before enough fluid has been lost to render his brakes inoperative.

Referring now to Figure 3 I have disclosed that embodiment of my invention which involves the use of a pair of auxiliary brake cylinders, each operated in conjunction with the master cylinder 10 previously described. These auxiliary cylinders are generally indicated at 31 and 32 and it will be noted that the construction of each is the same as that of the other.

Instead of the master cylinder 10 pumping brake fluid to each of the individual brakes in the usual manner, in the arrangement of Figure 3 fluid is pumped from the cylinder 10 to the auxiliary cylinders 31 and 32. Leading from the cylinder 31, for example, will be a conduit which is connected to any pair of the brakes desired, in this instance the front wheel brakes. The cylinder 32 has a conduit leading to the rear brakes. I have shown the cylinders 31 and 32 as operating either a pair of front wheel brakes or a pair of rear wheel brakes as desired, but should others prefer to incorporate different pairs of the brakes with the respective cylinders, this may be done quite easily. I have found it better to connect the front pair of brakes to one cylinder and the back pair of brakes to another cylinder for the reason that this prevents lop-sided braking should just one pair still be effective.

Normally when the foot pedal 13 is actuated and pressure released from the master cylinder 10 the effect will be to transmit pressure through the conduits 35 and 36, the cylinders 31 and 32 and the conduits 33 and 34 to all of the brakes whereby the vehicle is effectively stopped or slowed down as desired.

Should, however, a leak occur at any one of the brakes or lines leading thereto, it is apparent that fluid would normally escape therefrom. In the usual case this would mean that eventually all effective brake fluid would be removed from the whole system and no proper braking action could be obtained. By the arrangement of my invention that line in which the leak occurred would be cut off so that no further fluid would exit therefrom, the result being that although two of the brakes would thereby be rendered inoperative, the other pair of brakes could still be utilized and the driver would have at least 50% braking power at his disposal.

In order to accomplish the result just described I provide each of the cylinders 31 and 32 with a piston 37. This piston works against a spring 38. The piston 37 is provided with suitable sealing bands 39.

A slidable but spring biased plunger 40 is located in the piston 37, the spring 41 being located within a bore 42 provided for that purpose. It will also be observed that the piston 37 has a cut-out portion 43 arranged so as to provide an over-hanging lip 44 for a purpose shortly to be described.

The conduit 33 is shown as having a suitable fastening within a sleeve 45, the interior end of the conduit 33 having a seat or bearing portion 46. When a leak should occur, for example, in that part of the system controlled by the cylinder 31, forward movement of the piston 37 will tend to exhaust the brake fluid moved thereby out said leak. This will permit the piston 37 to tend to seat against the left hand end of the cylinder 31. When this happens the plunger 40 will seat against the member 46 and thereby prevent further fluid from being discharged through the conduit 33 and the leaking system connected therewith. The springs 41 insure a snug, leak-tight fit between the members 40 and 46.

In order to insure that the piston 37 will not move to the right as urged by the spring 38 when the foot pedal 13 is no longer actuated, I have provided means for locking the piston 37 in its forward or left hand position. These means comprise a pair of catch members 47 having surfaces 48 which will strike the overhanging lip 44 and become engaged within the groove 43 when the piston 37 is moved to such an extent that the plunger 40 is properly seated against the member 46. The spring-like nature of the members 47 insures that they will properly engage the overhanging lip 44. Such catch members prevent the piston 37 from returning to its position as normally urged by spring 38. Were it not for this catch mechanism, when the operator discontinued actuating the foot pedal 13 the piston 37 would move to the right whereupon further actuation of the pedal 13 would again result in the piston being moved to the left and more fluid being exhausted from the system.

It will be observed, therefore, that by the arrangement just described, a leak occurring in one part of the system will result in that part of the system being rendered inoperative to the extent that no more brake fluid will be put therethrough. This, of course, causes a loss of those brakes included in that part of the system so affected, but at the same time it permits normal actuation of the other auxiliary cylinder. Such normal actuation will produce effective braking operation in the pair of brakes connected to the system controlled by the non-affected auxiliary cylinder and associated part. In order to warn the operator that he is operating on 50% of his braking power only, I have provided a switch 49 and an actuating element 50, said switch being located in a pair of circuits 51 and 52 which leads, it will be understood, also include a battery and appropriate signal device located adjacent the operator. Thus, when the poston 37 moves to its inoperative position such as it will when a leak occurs in that part of the system controlled by it, it will actuate the member 50 so as to complete a connection through the switch 49 and thereby effect actuation of the signaling device whether such device be a light or some means audible to the operator. In this manner the operator will be informed that a leak has occurred in part of his brake system and that he has, therefore, only 50% of his normal brake action available to him. It is to be understood that the signal device can be arranged so as to indicate whether it is the front wheel or rear wheel system which is effected.

In Figure 3a I have indicated means by which air may be bled from a particular brake system if it is desired so to do. Normally when air or foreign matter gets in the brake fluid it is desired to run a certain amount of the fluid through the system until the air or foreign matter has been eliminated. This is usually done by simply actuating the master cylinder 10 and providing it with a suitable amount of fluid, a valve at each brake being opened sufficient to permit some discharge of the fluid as so actuated. While the master cylinder is worked so as to pump fluid through the system one will watch that fluid discharging from the valve until it is apparent that all air or foreign matter has been eliminated. It would not be possible to carry out this same procedure with a system incorporating the auxiliary cylinders 31 and 32 unless it were possible to circumvent the obstruction caused by the very presence of the piston 37 itself. This I have overcome by providing a pair of valves 53 which are connected by a suitable conduit 54.

As best seen in Figure 3a each of the valves 53 includes a hollow, threaded member 55 having a solid tip 56 which normally seats in the bottom of the member 53 so as to effectively block the orifice 57. When it is desired to bleed fluid through the system in the manner above indicated, the members 55 are loosened so as to unseat the member 56 from the orifice 57. Fluid then forced through the orifice 57 into the chamber 58 will enter the hollow member 55 via the opening 59 and continue to the other side of the piston through the cross-over conduit 54 and another valve similar to the arrangement 55–59 just described.

In Figure 4 I have illustrated a modification of the arrangement of either of the auxiliary cylinders 31 or 32. In this modification I have replaced the spring biased plunger 40 by a plunger 60 which is mounted on a resilient member 61. Such member will be carried by the piston 37. When the piston so moves as to seat the member 60 against the surface 46, a spring pressed plunger 62 will drop behind the piston 37 and prevent its return. The plunger 62 is shown as having an enlarged portion 63 slidable within a bore 64 on a lug fixed to the cylinder. A suitable spring is generally indicated at 65.

In Figure 5 I have illustrated yet another modification of the general arrangement of the Figure 3. In this arrangement the piston 37 of the cylinders 31 and 32 is provided with an enlarged portion 66 on which portion there is mounted a suitable plunger such as indicated at 60 and 40 in Figures 4 and 3 respectively, the plunger here shown being designated at 67. In this instance the piston 37 is prevented from making its return by means of solenoids generally indicated at 68, these solenoids being actuated when the plunger 67 moves to that point at which it prevents further discharge of fluid from the cylinder 31 or 32 as the case may be. It will be observed that the cylinders 31 and 32 are so arranged that not only will the proper solenoid 68 be actuated when a particular piston 37 is effected by loss of brake fluid in that portion of the system governed thereby, but also a proper signal will be given to the driver of the vehicle, such signal indicating which particular part of the system has been rendered inoperative.

A somewhat different modification of my invention is disclosed in Figure 6. In this figure I have disclosed one brake system as operated by a foot brake and a separate system as operated by a hand brake 69. For purposes of illustration I have indicated the particular brake applied to one of the vehicle wheels. Thus, in Figure 6, I have shown a pair of brake shoes 70 which are adapted to contact a brake lining 71 carried on the drum 72. The shoes 70 are normally maintained out of contact with the brake lining by reason of the springs 73.

In connection with each pair of shoes 71 I have provided a Siamese cylinder, a pair of pistons being operable in each portion of said Siamese cylinder.

The Siamese cylinder is generaly indicated at 74 and it will be seen to be comprised of two cylinder portions 75 and 76 respectively. A pair of pistons 77 operate within the portion 75 and another pair of pistons 78 operate within the portions 76. The cylinder 75 and its pistons 77 are actuated via the foot brake 13. Thus, when the pedal 13 is depressed and its master cylinder 10 thereby caused to discharge pressure through the system, the pistons 77 move so as to force the shoes 70 into contact with the lining 71 and thereby effectively brake the particular wheel in question.

It will be observed that actuation of the pistons 77 in the manner just described is completely independent of the pistons 78. These latter pistons are actuated by means of the hand brake 69 via a second master cylinder 80. Such cylinder will correspond to the cylinder 10. The brake lines leading from the cylinder 80 will be independent of the master cylinder 10. Thus, when pressure is exerted by the cylinder 80 the pistons 78 are moved so as to force the brake shoes into contact with the lining 71 thereby effectively brake the particular wheel in question.

It will be observed that the system just described contemplates the use of two separate master cylinders and separate brake lines and individual wheel cylinders at the various brake drums. Anthing that effects one of the systems, for example that governed by the master cylinder 10, will not have any effect on the system remaining. Thus the action of the hand brake is rendered completely separable from that of the foot brake. In setting up such a system it is possible that pairs of fluid lines will be coupled together and supported in the same bracket and so forth throughout the vehicle but it will still be evident that actual operation of the two systems will be completely independent.

It is also to be understood that any of the modifications described in Figures 1 through 5 and 7 may be incorporated in either that portion of the system of Figure 6 which is governed by the master cylinder 10 or that portion which is governed by the master cylinder 80. Although it is true that to some extent the system of Figure 6 involves a duplication of parts, and therefore added expense, it is believed that this is a relatively minor factor where safety is concerned, especially in high cost equipment such as large buses and trucks.

As will be evident from the foregoing description, modifications may be made in my invention without departing from the scope and spirit thereof, and although I have described my invention as embodied in certain structure I do not intend to be limited by such structure except insofar as it is specifically set forth in the subjoined claims.

Having thus described my invention, what I claim as new and what I desire to protect by United States Letters Patent is:

For use in combination with the master cylinder of a fluid brake system of the type commonly employed in automobiles and the like, a pair of auxiliary cylinders directly responsive to said master cylinder, each of said auxiliary cylinders controlling certain of the individual brakes in said system, a piston in each auxiliary cylinder, each said auxiliary cylinder having an exhaust port through which pressure is transmitted by said piston to the said certain brakes whereby to actuate same, and holding means in each said auxiliary cylinder to hold said piston adjacent said port when fluid is able to escape from that part of the brake system controlled by the particular auxiliary cylinder involved, the other of said auxiliary cylinders and pistons remaining in normal operation, whereby a single leak in the brake system causes a loss of brake fluid from a part of the system only, some of said individual brakes thereby remaining in operative condition even though others are rendered inoperative, said holding means comprising a plunger on each said piston and an electrical control circuit including a solenoid adjacent each said exhaust port, a said plunger being capable of completely plugging a said port, switch means in said control circuit to energize a said solenoid upon actuation of said switch means, means on said piston to actuate said switch means when a said plunger plugs a said port as occurs upon a said piston moving to a position adjacent a said port when fluid escapes, energization of said solenoid serving to hold said plunger in plugging relationship to said port, and signal means in said control circuit and energized by actuation of said switch means in the manner described.

References Cited in the file of this patent

UNITED STATES PATENTS

| | | |
|---|---|---|
| 2,018,912 | Carroll | Oct. 29, 1935 |
| 2,024,042 | Jance | Dec. 10, 1935 |
| 2,085,173 | Stansbury | June 29, 1937 |
| 2,093,015 | Madden | Sept. 14, 1937 |
| 2,121,653 | Davis | June 11, 1938 |
| 2,195,558 | Bowen | Jan. 2, 1940 |
| 2,501,800 | Wales | Mar. 28, 1950 |

FOREIGN PATENTS

| | | |
|---|---|---|
| 486,512 | Great Britain | Sept. 2, 1936 |
| 173,239 | Switzerland | Feb. 16, 1935 |